United States Patent
Chen et al.

(10) Patent No.: US 12,263,834 B2
(45) Date of Patent: Apr. 1, 2025

(54) SPATIAL PARKING PLACE DETECTION METHOD AND DEVICE, STORAGE MEDIUM, AND PROGRAM PRODUCT

(71) Applicant: BEIJING BAIDU NETCOM SCIENCE TECHNOLOGY CO., LTD., Beijing (CN)

(72) Inventors: Wenyang Chen, Beijing (CN); Bo Zhan, Beijing (CN); Zhiming Zhang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 441 days.

(21) Appl. No.: 17/711,082

(22) Filed: Apr. 1, 2022

(65) Prior Publication Data
US 2022/0219679 A1   Jul. 14, 2022

(30) Foreign Application Priority Data
Aug. 11, 2021   (CN) ........................ 202110921544.1

(51) Int. Cl.
G08G 1/14 (2006.01)
B60W 30/06 (2006.01)
(Continued)

(52) U.S. Cl.
CPC ............. *B60W 30/06* (2013.01); *G06T 7/73* (2017.01); *G06V 20/586* (2022.01); *G08G 1/143* (2013.01);
(Continued)

(58) Field of Classification Search
CPC ............ G06V 20/586; G06V 30/2551; G06V 30/1918; G06V 20/56; G06V 10/80;
(Continued)

(56) References Cited

U.S. PATENT DOCUMENTS

2011/0057814 A1* 3/2011 Park ..................... B60W 30/06
340/932.2
2020/0104613 A1   4/2020 Hirai
(Continued)

FOREIGN PATENT DOCUMENTS

CN    108281041 A   7/2018
CN    109532821 A   3/2019
(Continued)

OTHER PUBLICATIONS

An English translated version of CN112069862A_by_Huawei_Technologies_Corp.pdf.*
(Continued)

*Primary Examiner* — Cuong H Nguyen
(74) *Attorney, Agent, or Firm* — Tucker Ellis LLP

(57) ABSTRACT

The present disclosure provides a spatial parking place detection method and device, a storage medium and a program product, which relate to the field of data processing and, in particular, to the fields of computer vision, autonomous parking and autonomous driving. A specific implementation lies in: acquiring ultrasonic data around a vehicle collected by an ultrasonic sensor on the vehicle, and image data around the vehicle collected by an image collection apparatus; determining a first spatial parking place around the vehicle according to the ultrasonic data, and determining a second spatial parking place around the vehicle according to the image data; fusing the first spatial parking place and the second spatial parking place that are located at an identical position to determine a spatial parking place at that position; and checking the availability of the detected spatial parking place, and determining available spatial parking places of the vehicle.

17 Claims, 6 Drawing Sheets

(51) Int. Cl.
*G06T 7/73* (2017.01)
*G06V 20/58* (2022.01)

(52) U.S. Cl.
CPC ... *B60W 2420/403* (2013.01); *B60W 2420/54* (2013.01); *B60W 2552/53* (2020.02); *B60W 2554/802* (2020.02); *B60W 2556/35* (2020.02); *B60W 2556/40* (2020.02); *G06T 2207/30261* (2013.01); *G06T 2207/30264* (2013.01)

(58) Field of Classification Search
CPC ...... G06V 20/50; G06V 10/245; G08G 1/143; G08G 1/14; G08G 1/148; G06T 7/73; G06T 2207/30252; G06T 2207/30264; G06T 7/70; B60W 30/06
USPC .......................................................... 382/103
See application file for complete search history.

(56) References Cited

U.S. PATENT DOCUMENTS

| | | | |
|---|---|---|---|
| 2021/0042540 A1 | 2/2021 | Shih et al. | |
| 2021/0224562 A1* | 7/2021 | Zhan | ................ G06V 20/58 |
| 2023/0256967 A1* | 8/2023 | Sakai | ................ B60W 40/02 |

FOREIGN PATENT DOCUMENTS

| | | | | |
|---|---|---|---|---|
| CN | 110316182 A | | 10/2019 | |
| CN | 110775052 A | | 2/2020 | |
| CN | 110861639 A | * | 3/2020 | ............ B60W 30/06 |
| CN | 111311925 A | | 6/2020 | |
| CN | 111753649 A | * | 10/2020 | ............ G01S 15/08 |
| CN | 112002125 A | | 11/2020 | |
| CN | 112069862 A | * | 12/2020 | ......... G06K 9/00798 |
| CN | 112633152 A | * | 4/2021 | ......... G06K 9/00791 |
| CN | 112639821 A | | 4/2021 | |
| CN | 113192356 A | | 7/2021 | |
| CN | 115384482 A | * | 11/2022 | |
| JP | 2020144711 A | * | 9/2020 | ............ B60W 10/04 |

OTHER PUBLICATIONS

An English translated version of Jin_Na_et_al_CN111753649A_by_Shanghai_OFilm_Smart_Car_Technology_Co_Lt.*
H. Bura, N. Lin, N. Kumar, S. Malekar, S. Nagaraj and K. Liu, "An Edge Based Smart Parking Solution Using Camera Networks and Deep Learning," 2018 IEEE International Conference on Cognitive Computing (ICCC), San Francisco, CA, USA, 2018, pp. 17-24, doi: 10.1109/ICCC.2018.00010. (Year:2018).*
Nie, Jian, et al. "A multimodality fusion deep neural network and safety test strategy for intelligent vehicles." IEEE transactions on intelligent vehicles 6.2 (2020): 310-322.(Year:2020).*
Zhao, Yuxuan. "Automated Parking Planning with Vision-Based BEV Approach." arXiv preprint arXiv:2406.15430 (2024). (Year: 2024).*
Xu, Yi, et al. "Parking Space Detection and Path Planning Based on VIDAR." Journal of Robotics 2021.1 (2021): 4943316. (Year: 2021).*
Ma, Shidian, et al. "Parking space recognition method based on parking space feature construction in the scene of autonomous valet parking." Applied Sciences 11.6 (2021): 2759. (Year: 2021).*
Han, Guo Liang. "Automatic parking path planning based on ant colony optimization and the grid method." Journal of Sensors 2021.1 (2021): 8592558. (Year: 2021).*
Office Action of corresponding Chinese Application No. 202110921544.1, dated Apr. 19, 2022, 12 pages.
Translation of Office Action of corresponding Chinese Application No. 202110921544.1, dated Apr. 19, 2022, 6 pages.
European Search Report of corresponding European Patent Application No. 22166548, dated Aug. 11, 2022, 12 pages.
The Second Office Action of corresponding Chinese Patent Application No. 202110921544.1, dated Aug. 15, 2022, 23 pages.
Suhr et al., "Sensor Fusion-Based Vacant Parking Slot Detection and Tracking", IEEE Transactions on Intelligent Transportation Systems, vol. 15, No. I, Feb. 2014, 16 pages.

* cited by examiner

SPATIAL PARKING PLACE DETECTION METHOD AND DEVICE, STORAGE MEDIUM, AND PROGRAM PRODUCT

CROSS-REFERENCE TO RELATED APPLICATION

This application claims priority to Chinese Patent Application No. 202110921544.1, filed on Aug. 11, 2021, which is hereby incorporated by reference in its entirety.

TECHNICAL FIELD

The present disclosure relates to the fields of computer vision, autonomous parking, and autonomous driving in data processing, in particular, to a spatial parking place detection method and device, a storage medium, and a program product.

BACKGROUND

A spatial parking place refers to an available parking place derived from the parking sequence of other vehicles and the size of an available parking space when there is no marking line on the ground, and is commonly found on a roadside.

For the current spatial parking place detection scheme, generally, the spatial parking place is detected with ultrasonic sensor signals through a signal edge transition detection method or a group point filter detection method, and the parking place type is determined according to the length and width of the spatial parking place.

SUMMARY

The present disclosure provides a spatial parking place detection method and device, a storage medium and a program product.

According to a first aspect of the present disclosure, provided is a spatial parking place detection method, including:
  acquiring, during a vehicle traveling process, ultrasonic data around a vehicle collected by an ultrasonic sensor on the vehicle, and image data around the vehicle collected by an image collection apparatus;
  determining a first spatial parking place around the vehicle according to the ultrasonic data, and determining a second spatial parking place around the vehicle according to the image data;
  fusing the first spatial parking place and the second spatial parking place that are located at an identical position to determine a spatial parking place at that position; and
  determining available spatial parking places of the vehicle from spatial parking places at all positions.

According to a second aspect of the present disclosure, provided is a spatial parking place detection device, including:
  a memory, a processor, and a computer program stored on the memory and operable on the processor,
  where the processor, when running the computer program, is configured to:
  acquire, during a vehicle traveling process, ultrasonic data around a vehicle collected by an ultrasonic sensor on the vehicle, and image data around the vehicle collected by an image collection apparatus;
  determine a first spatial parking place around the vehicle according to the ultrasonic data;
  determine a second spatial parking place around the vehicle according to the image data;
  fuse the first spatial parking place and the second spatial parking place that are located at an identical position to determine a spatial parking place at that position; and
  determine available spatial parking places of the vehicle from spatial parking places at all positions.

According to a third aspect of the present disclosure, provided is a non-transitory computer-readable storage medium having stored therein computer instructions, where the computer instructions are configured to enable a computer to:
  acquire, during a vehicle traveling process, ultrasonic data around a vehicle collected by an ultrasonic sensor on the vehicle, and image data around the vehicle collected by an image collection apparatus;
  determine a first spatial parking place around the vehicle according to the ultrasonic data;
  determine a second spatial parking place around the vehicle according to the image data;
  fuse the first spatial parking place and the second spatial parking place that are located at an identical position to determine a spatial parking place at that position; and
  determine available spatial parking places of the vehicle from spatial parking places at all positions.

It should be understood that the content described in this part is not intended to identify a key feature or an important feature in an embodiment of present disclosure, nor is it intended to limit the scope of the present disclosure. Other features of the present disclosure will become readily comprehensible through the following description.

BRIEF DESCRIPTION OF DRAWINGS

The accompanying drawings are used to better understand the present solution, but do not constitute a limitation to the present disclosure. Among them.

DESCRIPTION OF EMBODIMENTS

Figure 1:
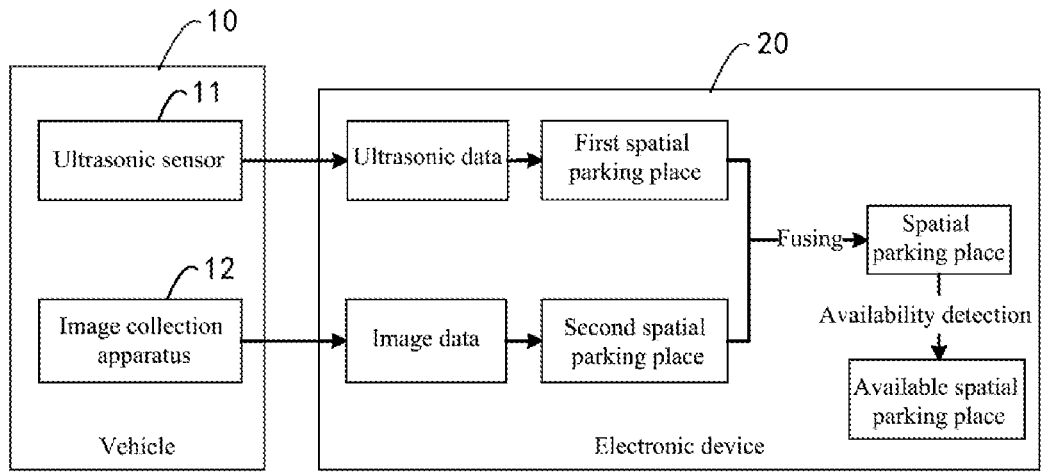
FIG. 1 is a system framework diagram in which a spatial parking place detection method according to an embodiment of the present disclosure can be implemented.

Exemplary embodiments of the present disclosure will be described hereunder with reference to the accompanying drawings, which include therein various details of the embodiments of the present disclosure to facilitate understanding and should be considered as to be merely exemplary. Therefore, those of ordinary skill in the art should realize that various changes and modifications can be made to the embodiments described herein without departing from the scope and spirit of the present disclosure. Likewise, for clarity and conciseness, descriptions of well-known functions and structures are omitted in the following description.

The present disclosure provides a spatial parking place detection method and device, a storage medium and a program product, which are applied in computer vision, autonomous parking, and autonomous driving in the field of data processing to improve the detection rate of a spatial parking place.

A parking scenario is usually encountered in daily driving. It is often easy to encounter a narrow parking place or even a narrow parking place without parking lines, and manual driving may cause scratches and other situations. With the technical development of intelligent vehicles, unmanned vehicles usually support an autonomous assisted parking function, and then the detection of a spatial parking place and the detection accuracy directly affect the parking success rate and experience of this function.

For the current spatial parking place detection scheme, generally, the spatial parking place is detected with ultrasonic sensor signals through a signal edge transition detection method or a group point filter detection method, and the parking place type is determined according to the length and width of the spatial parking place. However, the use of the ultrasonic sensor signals for the spatial parking place detection has a small parking space retrieval range, and is prone to crosstalk due to ultrasonic waves of the same frequency from other vehicles, resulting in a low detection rate of spatial parking place.

The transition edge detection of the ultrasonic sensor signals is intended to determine a parking place type typically by driving a vehicle through a spatial parking place to determine the length of an available parking space according to a transition edge in combination with driving information of the present vehicle and ultrasonic range variations. This scheme is of a relatively simple implementation, but the detection rate of a vertical spatial parking place is relatively low. Since transition edges are gradual for distance values collected by ultrasonic waves, the position accuracy of a reference obstacle for the spatial parking place is inaccurately determined, and it is easy to cause crosstalk due to ultrasonic effects from other vehicles.

The group point filter detection method of the ultrasonic sensor signals is intended to, by driving a vehicle through a spatial parking place, perform information fusion through Kalman filtering in combination with driving information of the present vehicle and multi-ultrasonic waves to determine location points of an obstacle to be detected, cluster the points into segments and determine a type of the spatial parking place according to a size of space between the segments. It is also prone to crosstalk due to ultrasonic waves of the same frequency from other vehicles. Moreover, when encountered with a narrow vertical spatial parking place, the ultrasonic waves, due to impacts from obstacles on both sides, cannot determine whether there is an obstacle in deep, and meanwhile a detection range of the parking place is generally 0.5 m to 2.0 m.

At present, the scheme using the ultrasonic sensor signals for the spatial parking place detection has a small parking space retrieval range, and is prone to crosstalk due to ultrasonic waves of the same frequency from other vehicles, resulting in a low detection rate of spatial parking place.

The spatial parking place detection method according to the present disclosure can be applied to the system architecture shown in FIG. 1. As shown in FIG. 1, during a process where a vehicle 10 looks for a spatial parking place when driving through a road beside spatial parking places, an ultrasonic sensor 11 on the vehicle collects ultrasonic data around the vehicle, while an image collection apparatus 12 on the vehicle 10 collects image data around the vehicle, where the ultrasonic data and the image data are transmitted to an electronic device 20. The electronic device 20 determines a first spatial parking place around the vehicle according to the ultrasonic data and determines a second spatial parking place around the vehicle according to the image data; fuses the first spatial parking place and the second spatial parking place that are located at an identical position to determine a spatial parking place at that position; and determines available spatial parking places of the vehicle 10 from spatial parking places at all positions, so that a spatial parking space retrieval range can be expanded and the accuracy and detection rate of the spatial parking place can be improved.

In some application scenarios, after determining the available spatial parking places, the electronic device 20 may also generate, according to a selected target parking place, a navigation route from the current position of the vehicle to the target parking place, and control the vehicle to park into the target parking place autonomously.

Figure 2:
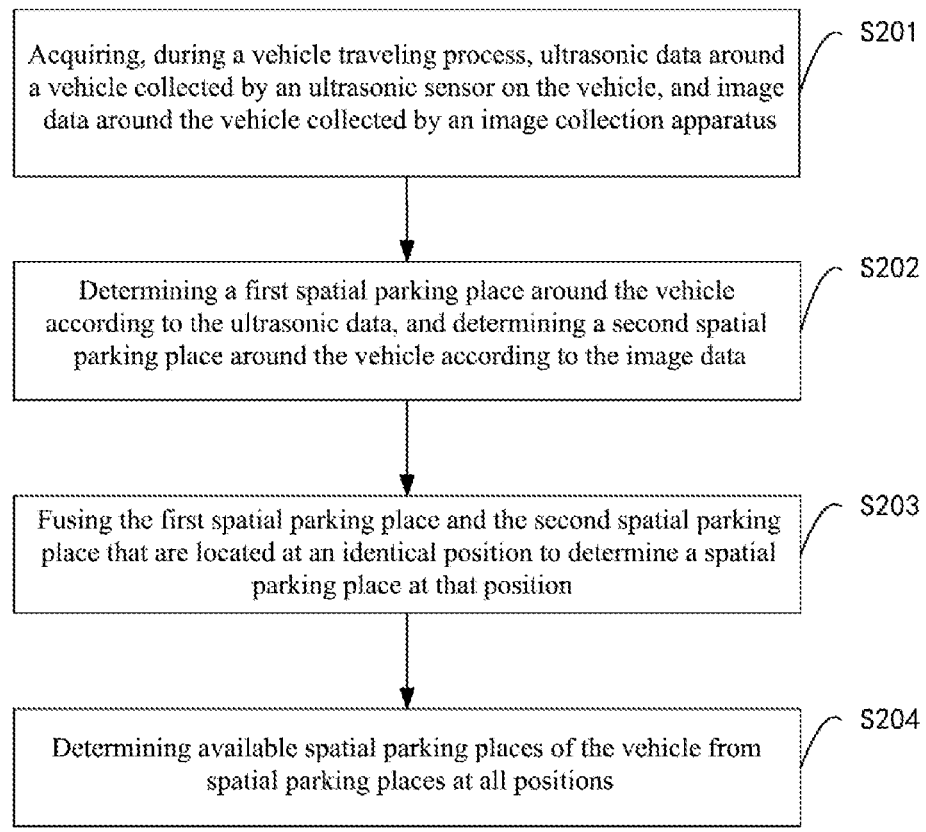
FIG. 2 is a flowchart of a spatial parking place detection method according to a first embodiment of the present disclosure.

FIG. 2 is a flowchart of a spatial parking place detection method according to a first embodiment of the present disclosure. The spatial parking place detection method provided in the present embodiment may specifically be used for an electronic device for performing spatial parking place detection, where the electronic device may be a vehicle-mounted device, such as a vehicle-mounted terminal, or a cloud server. In other embodiments, the electronic device may also be implemented in other manners, which is not specifically limited in the present embodiment.

As shown in FIG. 2, the method specifically has the following steps.

Step S201: acquiring, during a vehicle traveling process, ultrasonic data around a vehicle collected by an ultrasonic sensor on the vehicle, and image data around the vehicle collected by an image collection apparatus.

During a process where a vehicle looks for a spatial parking place when driving through spatial parking places beside a road, an ultrasonic sensor on the vehicle collects ultrasonic data around the vehicle in real time, and meanwhile an image collection apparatus on the vehicle collects image data around the vehicle in real time. Both the ultrasonic data and the image data contain environmental information around the vehicle.

In an embodiment, the ultrasonic sensor on the vehicle may include multiple sensors which are arranged at different positions around the vehicle and which can collect measurement data around the vehicle at different times and positions to obtain ultrasonic data.

In an embodiment, the image collection apparatus on the vehicle may also include multiple image collection apparatuses, which are respectively arranged at multiple different positions on the top of the vehicle or around the vehicle, and which can collect image data around the vehicle at different times and positions.

In the present embodiment, a duration and a frequency for spatial parking place detection may be set and adjusted according to requirements of an actual application scenario.

Exemplarily, in response to a spatial parking place detection instruction, available spatial parking places are detected through steps S202-S204 according to ultrasonic data and image data collected in a previous time period per each interval period within a preset duration. At the end of the preset duration, one of the available spatial parking places is selected as a target parking place according to all available spatial parking places detected within the preset duration.

Both the preset duration and the interval period can be set and adjusted in length according to requirements of an actual application scenario, which is not specifically limited here.

Step S202: determining a first spatial parking place around the vehicle according to the ultrasonic data, and determining a second spatial parking place around the vehicle according to the image data.

In the present embodiment, after the ultrasonic data around the vehicle is acquired, the first spatial parking place around the vehicle is detected according to the ultrasonic data.

After the image data around the vehicle is acquired, the second spatial parking place around the vehicle is detected according to the image data.

Step S203: fusing the first spatial parking place and the second spatial parking place that are located at an identical position to determine a spatial parking place at that position.

After the first spatial parking place around the vehicle is detected according to the ultrasonic data and the second spatial parking place around the vehicle is determined according to the image data, the first spatial parking place and the second spatial parking place determined based on different data sources at an identical position are fused to determine a spatial parking place at that position, so that not only the accuracy of the spatial parking place can be increased, but also the detection range of the spatial parking place can be expanded due to a large detection range of the image data, e.g., increasing to 0.5 m-4.0 m from a conventional dimension of 0.5 m-2.0 m.

Step S204: determining available spatial parking places of the vehicle from spatial parking places at all positions.

After the spatial parking places determined based on different data sources are fused to obtain fused spatial parking places, it is also possible to perform availability detection on the obtained spatial parking places so as to exclude unavailable spatial parking places therefrom and reserve available spatial parking places.

With the method according to the present embodiment, various types of spatial parking places can be detected simultaneously, such as a double-boundary vertical spatial parking place, a single-boundary vertical spatial parking place (including left and right boundaries), a double-boundary parallel spatial parking place, a single-boundary parallel spatial parking place (including left and right boundaries), and an angled spatial parking place. Among them, the double-boundary spatial parking place means that there are obstacles on both sides of the spatial parking place, and the single-boundary spatial parking place means that there is an obstacle on one side of the spatial parking place while no obstacle on the other side. The obstacles on both sides of the spatial parking place are mainly vehicles on both sides, or may be walls, isolation belts, or the like.

The present embodiment allows for: acquiring ultrasonic data around a vehicle collected by an ultrasonic sensor on the vehicle and image data around the vehicle collected by an image collection apparatus; determining a first spatial parking place around the vehicle according to the ultrasonic data, and determining a second spatial parking place around the vehicle according to the image data; fusing the first spatial parking place and the second spatial parking place that are located at an identical position to determine a spatial parking place at that position; and finally determining available spatial parking places of the vehicle by means of detecting spatial parking places respectively with two different data sources, i.e. the ultrasonic data and the image data, and fusing the spatial parking places and checking availability of the detected spatial parking places. In this way, when the ultrasonic sensor is prone to crosstalk effects, a spatial parking place can be detected through the image data so that the problem of ultrasonic crosstalk can be solved and the detection accuracy and detection rate of the spatial parking place are improved. Since the detection range of the image data is large, the detection range of the spatial parking place can be expanded. Based on the image data, obstacle information around an obstacle can be fully mined, including not only obstacle information on a frontal side of the obstacle vehicle, but also obstacle information on a lateral side of the obstacle vehicle, thus the accuracy of spatial parking place detection can be significantly improved.

Figure 3:
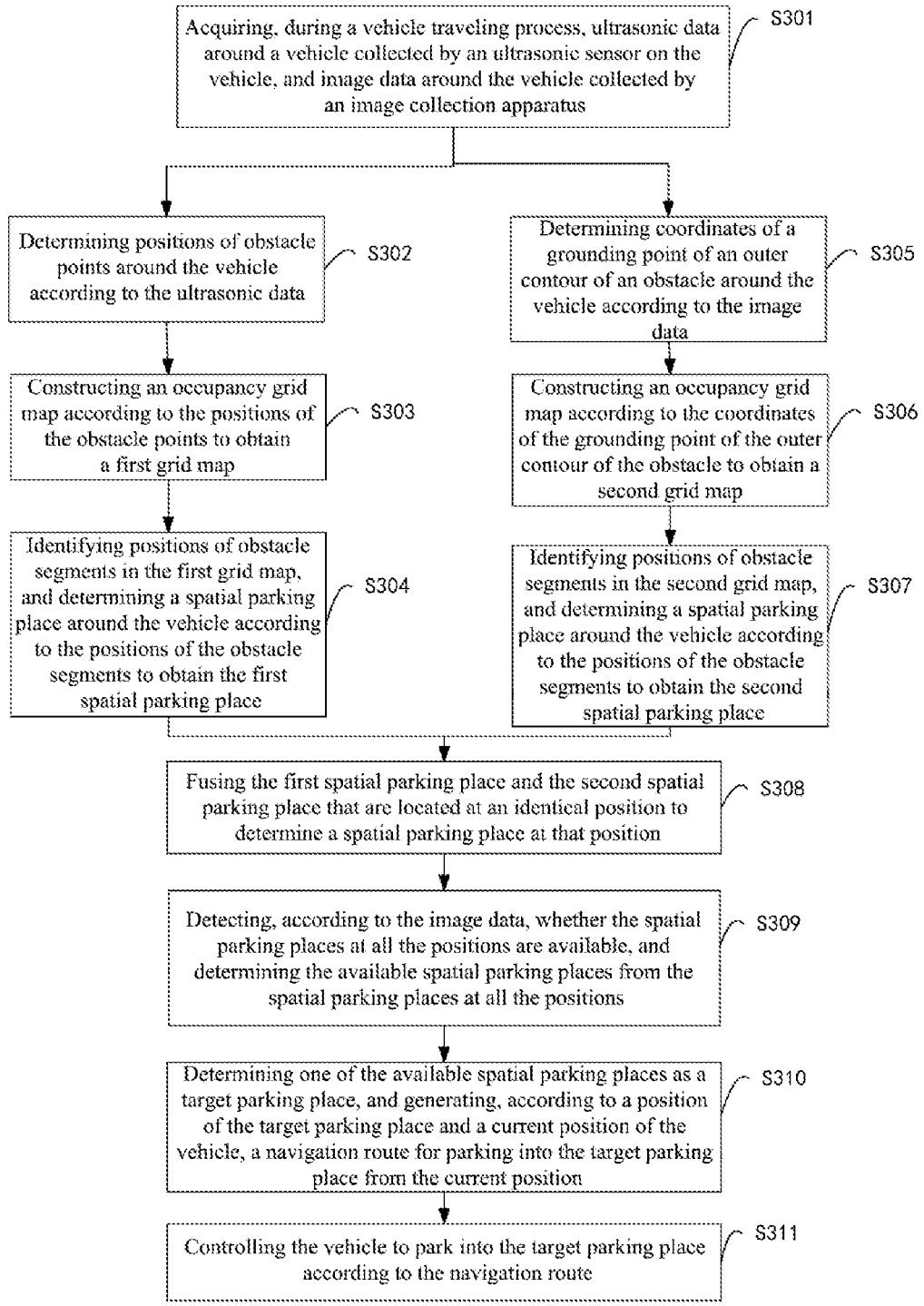
FIG. 3 is a flowchart of a spatial parking place detection method according to a second embodiment of the present disclosure.
Figure 4:
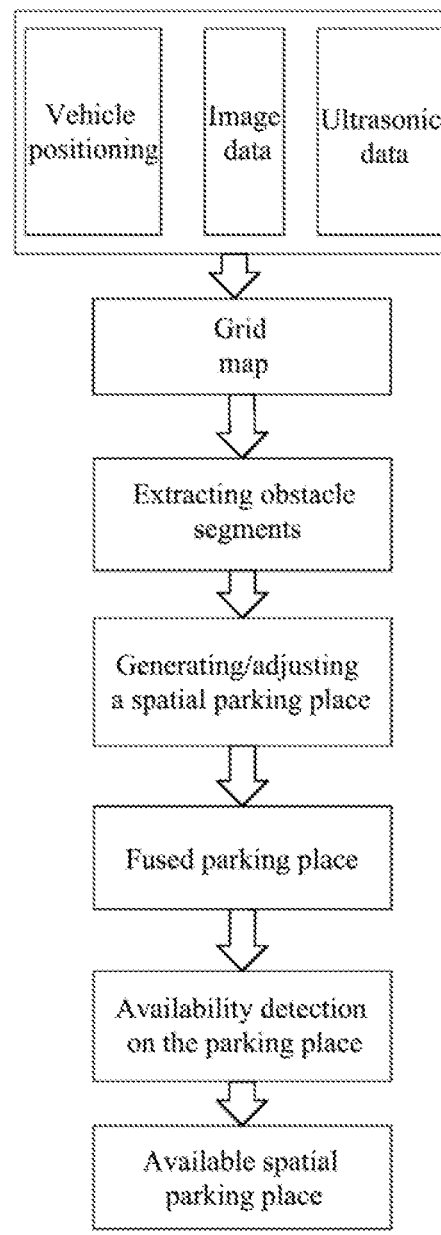
FIG. 4 is a general framework diagram of the spatial parking place detection method according to the second embodiment of the present disclosure.

FIG. 3 is a flowchart of a spatial parking place detection method according to a second embodiment of the present disclosure; FIG. 4 is a general framework diagram of the spatial parking place detection method according to the second embodiment of the present disclosure. On the basis of the first embodiment described above, in the present embodiment, the general framework of the spatial parking place detection method is shown in FIG. 4. First, it is necessary to collect environmental information around a vehicle through different sensors to obtain ultrasonic data and image data, and meanwhile to acquire position information of the vehicle; construct a first grid map according to the ultrasonic data and the position information of the vehicle, extract linear obstacle segments from the first grid map, and generate/adjust a first spatial parking place according to the linear obstacle segments; construct a second grid map according to the image data and the position information of the vehicle, extract linear obstacle segments from the second grid map, and generate/adjust a second spatial parking place according to the linear obstacle segments; fuse the first spatial parking place and the second spatial parking place at a parking level to obtain fused spatial parking places; and perform availability detection on the fused spatial parking places so as to determine available spatial parking places.

The first grid map and the second grid map may be two-dimensional occupancy grid maps, through which an outer contour of an obstacle around the vehicle can be described accurately and effectively.

A specific implementation of the spatial parking place detection method is exemplarily described hereunder with reference to FIG. 3. As shown in FIG. 3, the method specifically has the following steps.

Step S301: acquiring, during a vehicle traveling process, ultrasonic data around a vehicle collected by an ultrasonic sensor on the vehicle, and image data around the vehicle collected by an image collection apparatus.

During a process where a vehicle looks for a spatial parking place when driving through spatial parking places beside a road, an ultrasonic sensor on the vehicle collects ultrasonic data around the vehicle in real time, and meanwhile an image collection apparatus on the vehicle collects image data around the vehicle in real time. Both the ultrasonic data and the image data contain environmental information around the vehicle.

In an embodiment, the ultrasonic sensor on the vehicle may include multiple sensors which are arranged at different positions around the vehicle and which can collect measurement data around the vehicle at different times and positions to obtain ultrasonic data.

In an embodiment, the image collection apparatus on the vehicle may also include multiple image collection apparatuses, which are respectively arranged at multiple different positions on the top of the vehicle or around the vehicle, and which can collect image data around the vehicle at different times and positions.

After the ultrasonic data around the vehicle is acquired, through Steps S302-S304, the first spatial parking place around the vehicle is determined according to the ultrasonic data.

After the image data around the vehicle is acquired, through Steps S305-S307, the second spatial parking place around the vehicle is determined according to the image data.

In the present embodiment, the processing procedure of determining the first spatial parking place around the vehicle according to the ultrasonic data and the processing procedure of determining the second spatial parking place around the vehicle according to the image data may be performed in parallel to improve the efficiency of spatial parking place detection.

Step S302: determining positions of obstacle points around the vehicle according to the ultrasonic data.

In this step, according to the ultrasonic data, internal and external parameters of the ultrasonic sensor and location information of the vehicle, the distance from obstacle points around the vehicle to the vehicle may be determined, and then positions of obstacle points around the vehicle may be further determined.

Step 303: constructing an occupancy grid map according to the positions of the obstacle points to obtain a first grid map.

The occupancy grid map is to convert a high-dimensional (e.g., 3-dimensional) mapping problem into many independent 1-dimensional grid estimation problems. The probability grid map (hereinafter referred to as the grid map) is environmentally divided into a series of grids, where each grid is given a possible value, indicating a probability at which the grid is occupied.

In this step, firstly, an occupancy grid map corresponding to a preset geographic area around the vehicle is constructed, where the grid map includes multiple grid cells, and a state value of a grid cell indicates a value of probability at which an outer contour of an obstacle passes through the grid cell. An initial value of the state value of the grid cell is 0.

The size and shape of the preset geographic area may be set and adjusted according to requirements of an actual application scenario, which is not specifically limited in the present embodiment.

After the positions of the obstacle points around the vehicle are determined according to the ultrasonic data, a grid cell into which each obstacle point falls is determined according to the positions of the obstacle points.

Specifically, the ultrasonic data includes at least one frame of data, and for each frame of data, multiple obstacle points are determined according to each frame of data, and a grid cell into which each obstacle point falls is determined.

After grid cells into which all obstacle points fall are determined, a value of probability at which an outer contour of an obstacle passes through the grid cell is determined according to the number of obstacle points falling into each grid cell.

In an embodiment, the grid cell with a probability value greater than a first threshold is marked as a grid cell occupied by the outer contour of the obstacle, the grid cell with a probability value less than the first threshold is marked as a grid cell not occupied by the outer contour of the obstacle, and the grid cell with a probability value equal to the first threshold is marked as an unknown state, to obtain the first grid map.

In an embodiment, the grid cell with a probability value greater than or equal to a first threshold is marked as a grid cell occupied by the outer contour of the obstacle, and the grid cell with a probability value less than the first threshold is marked as a grid cell not occupied by the outer contour of the obstacle, to obtain the first grid map; and the grid cell with an unknown state is used as an occupied grid cell to avoid occurrence of collisions or scratches due to unavailability of the determined spatial parking place when the vehicle is parking into the spatial parking place.

Exemplarily, for a grid cell with a probability value greater than or equal to a first threshold, its state value may be set to 1, indicating that the grid cell is occupied by the outer contour of the obstacle. For a grid cell with a probability value less than the first threshold, its state value is set to 0, indicating that the grid cell is not occupied by the outer contour of the obstacle.

The first threshold may be set and adjusted according to requirements of an actual application scenario, for example, the first threshold may be 0.5, which is not specifically limited in the present embodiment.

Through the first grid map determined in this step, the position of the outer contour of the obstacle around the vehicle can be accurately and effectively described.

In an embodiment, after the first grid map is determined, it is also possible to convert the first grid map into a picture in which grid cells in different states are distinguished, so as to show the position of the outer contour of the obstacle around the vehicle more intuitively.

Figure 5:
FIG. 5 is an exemplary diagram illustrating a picture corresponding to a first grid map according to the second embodiment of the present disclosure.

For example, the first threshold may be 0.5: when a grid cell corresponds to a probability value of 0.5, the grid cell is in an unknown state; when a grid cell corresponds to a probability value less than 0.5, the grid cell is not occupied, that is, the grid cell is empty; when a grid cell corresponds to a probability value greater than 0.5, the grid cell is occupied, that is, there is an obstacle in the grid cell. When the first grid map is converted into a picture for displaying in a more intuitive manner, an occupied grid cell may be painted in black, an unoccupied grid cell may be painted in white, and a grid cell with an unknown state may be painted in gray to form the picture shown in FIG. 5.

Step S304: identifying positions of obstacle segments in the first grid map, and determining a spatial parking place around the vehicle according to the positions of the obstacle segments to obtain the first spatial parking place.

In a practical application, across an observation section of the ultrasonic sensor, a forward side of an obstacle vehicle is approximated to a linear segment whose length is within a range of transversal widths of the vehicle, and a lateral side of the obstacle vehicle is approximated to a linear segment whose length is within a range of longitudinal lengths of the vehicle. Moreover, the linear segments on the forward side and on the lateral side of the vehicle are perpendicular to each other.

The range of transversal widths of the vehicle and the range of longitudinal lengths of the vehicle may be set and adjusted according to the dimensional size of the vehicle suitable for the parking place, which is not specifically limited in the present embodiment.

For example, for most vehicles of a certain model, the front and rear sides of the vehicle may be approximated to linear segments of 1-2 meters, and the lateral sides of the vehicle may be approximated to linear segments of 4-6 meters. The range of transversal widths of the vehicle may be set to 1-2 meters, and the range of longitudinal lengths of the vehicle may be set to 4-6 meters.

In the present embodiment, a position of an outer contour of a parked obstacle vehicle is determined by identifying obstacle segments in the first grid map, and a spatial parking place around the vehicle is further determined according to the positions of the obstacle segments to obtain the first spatial parking place.

In this step, the identifying the positions of the obstacle segments in any occupancy grid map may be specifically implemented in the following manner:

extracting linear segments in the occupancy grid map to obtain the obstacle segments around the vehicle, and determining the positions of the obstacle segments. In this way, the obstacle segments in the first grid map can be accurately identified, thereby providing accurate basic data for spatial parking place identification.

In an embodiment, the Hough transform or Random sample consensus (RANSAC for short) may be used to extract linear segments from the first grid map.

In spatial parking place detection, a spatial parking place may be firstly generated, and then the spatial parking place may be further adjusted to improve the accuracy of the spatial parking place. In an embodiment, the Hough transform may be used in the stage of spatial parking place generation to quickly extract linear segments from the first grid map; and the RANSAC may be used in the stage of spatial parking place adjustment to extract linear segments from the first grid map.

In this step, the determining the spatial parking place around the vehicle according to the positions of the obstacle segments may be specifically implemented in the following manner:

sieving obstacle segments adaptable to a length direction of the vehicle according to the positions of the obstacle segments and pose information of the vehicle; and determining, for any two adjacent obstacle segments of the sieved obstacle segments, a spatial parking place between the two adjacent obstacle segments according to a spacing distance between the two adjacent obstacle segments along the length direction of the vehicle, a parking place type of the spatial parking place around the vehicle and a parking place dimension corresponding to the parking place type.

The parking place type may include: a vertical parking place, a parallel parking place, and an angled parking place.

In a practical application, when a vehicle travels along a road to look for a spatial parking place on a lateral side of the vehicle (both sides of the road), the length direction of the vehicle is also a direction in which the road extends longitudinally.

The obstacle segments adaptable to the length direction of the vehicle refer to obstacle segments parallel to the length direction of the vehicle (that is, the direction in which the road extends) or having an included angle therewith smaller than a preset angular threshold. The preset angular threshold may be set and adjusted according to requirements of an actual application scenario, which is not specifically limited here.

After the obstacle segments adaptable to the length direction of the vehicle are sieved, the sieved obstacle segments include contour segments of a parked obstacle vehicle facing the road. If two obstacle vehicles are parked next to each other (there is no spatial parking place therebetween), a spacing distance between the two obstacle segments along the length direction of the vehicle will be very small. If a spacing distance between two obstacle segments along the length direction of the vehicle is greater than the width (for a vertical parking place) or length (for a parallel parking place) of one parking place, it may be determined that there is at least one spatial parking place between the two obstacle segments; the number of and positions of spatial parking places between the two obstacle segments may be determined according to the type and the parking place dimension of the spatial parking places. In this way, a spatial parking place around the vehicle can be accurately detected according to the first grid map, and the accuracy of spatial parking place detection based on ultrasonic data is improved.

Further, for any two adjacent obstacle segments of the sieved obstacle segments, before the spatial parking place between the two adjacent obstacle segments is determined according to the spacing distance between the two adjacent obstacle segments along the length direction of the vehicle, the parking place type of the spatial parking place and the parking place dimension corresponding to the parking place type, the parking place type of the spatial parking place around the vehicle is determined. After the parking place type is determined, the position of the spatial parking place around the vehicle can be accurately determined according to the parking place type and the dimension of the spatial parking place.

In an embodiment, the determining the parking place type of the spatial parking place around the vehicle may be implemented in the following manner:

performing an image identification according to the image data to determine a vehicle obstacle around the vehicle; and determining the parking place type of the spatial parking place around the vehicle according to a parking direction of a vehicle obstacle lateral to the vehicle. Based on the image data, an obstacle type can be accurately identified so that a vehicle obstacle around the vehicle is identified, and a parking direction of the vehicle obstacle may be accurately determined, thereby accurately determining the parking place type of the spatial parking place. Based on the accurate parking place type, it is possible to improve the accuracy of spatial parking place detection.

The vehicle obstacle refers to an obstacle whose type is a vehicle, also termed as an obstacle vehicle.

Exemplarily, if a vehicle obstacle lateral to the vehicle (beside a road) is parked perpendicular (or approximately perpendicular) to the road, it can be determined that the spatial parking place beside the road is a vertical parking place; if a vehicle obstacle lateral to the vehicle (beside a road) is parked parallel (or approximately parallel) to the road, it can be determined that the spatial parking place beside the road is a parallel parking place; if a lateral contour segment of a vehicle obstacle lateral to the vehicle (beside a road) is angled with the road to a certain extent, it can be determined that the spatial parking place beside the road is an angled parking place.

In an embodiment, the determining the parking place type of the spatial parking place around the vehicle may also be implemented in the following manner:

sieving a longitudinal vehicle boundary segment and a transversal vehicle boundary segment according to lengths of the obstacle segments around the vehicle, where the longitudinal vehicle boundary segment refers to an obstacle segment whose segment length is within a range of longitudinal lengths of the vehicle, and the transversal vehicle boundary segment refers to an obstacle segment whose segment length is within a range of transversal widths of the vehicle; and determining the parking place type of the spatial parking place around the vehicle according to positions of the longitudinal vehicle boundary segment and the transversal vehicle boundary segment.

In this way, even when the determining the parking place type according to the image data is failed, it is possible to determine the transversal vehicle boundary segment and the longitudinal vehicle boundary segment of the vehicle obstacle parked around the vehicle according to the lengths of the obstacle segments around the vehicle, so that the vehicle parking direction can be removed and the parking place type is further determined.

In the present embodiment, after the ultrasonic data around the vehicle is acquired, through Steps S302-S304, the first spatial parking place around the vehicle is determined according to the ultrasonic data, and thus the accuracy of spatial parking place detection based on ultrasonic data can be improved.

Step S305: determining coordinates of a grounding point of an outer contour of an obstacle around the vehicle according to the image data.

In this step, by performing deep learning processing on the image data around the vehicle, a grounding contour of an obstacle around the vehicle can be determined, including 3D coordinates of one or more grounding points.

Exemplarily, in the present embodiment, the coordinates of the grounding point of the outer contour of the obstacle around the vehicle may be identified based on a visual freespace technology. Freespace means an area where automobiles can travel, including areas staying clear of other automobiles, pedestrians, and road sides. This technology not only uses an image identification algorithm, but also covers a geometric measurement algorithm in computer vision, that is, acquiring the distance of a target area in camera coordinate system.

Step S306: constructing an occupancy grid map according to the coordinates of the grounding point of the outer contour of the obstacle to obtain a second grid map.

In this step, firstly, an occupancy grid map corresponding to a preset geographic area around the vehicle is constructed, where the grid map includes multiple grid cells, and a state value of a grid cell indicates a value of probability at which an outer contour of an obstacle passes through the grid cell. An initial value of the state value of the grid cell is 0.

The size and shape of the preset geographic area may be set and adjusted according to requirements of an actual application scenario, which is not specifically limited in the present embodiment.

After the coordinates of the grounding point of the outer contour of the obstacle around the vehicle are determined according to the image data, a grid cell into which the grounding point of the outer contour of the obstacle falls is determined according to the coordinates of the grounding point of the outer contour of the obstacle.

Specifically, the image data includes at least one frame of data, and for each frame of data, a grounding point of an outer contour of an obstacle is determined according to each frame of data, and a grid cell into which each grounding point falls is determined.

After grid cells into which all grounding points of the outer contour of the obstacle fall are determined, a value of probability at which the outer contour of the obstacle passes through the grid cell is determined according to the number of grounding points falling into each grid cell.

In an embodiment, the grid cell with a probability value greater than a second threshold is marked as a grid cell occupied by the outer contour of the obstacle, the grid cell with a probability value less than the second threshold is marked as a grid cell not occupied by the outer contour of the obstacle, and the grid cell with a probability value equal to the second threshold is marked as an unknown state, to obtain the second grid map.

In an embodiment, the grid cell with a probability value greater than or equal to a second threshold is marked as a grid cell occupied by the outer contour of the obstacle, and the grid cell with a probability value less than the second threshold is marked as a grid cell not occupied by the outer contour of the obstacle, to obtain the second grid map; and the grid cell with an unknown state is used as an occupied grid cell to avoid occurrence of collisions or scratches due to unavailability of the determined spatial parking place when the vehicle is parking into the spatial parking place.

Exemplarily, for a grid cell with a probability value greater than or equal to a second threshold, its state value may be set to 1, indicating that the grid cell is occupied by the outer contour of the obstacle. For a grid cell with a probability value less than the second threshold, its state value is set to 0, indicating that the grid cell is not occupied by the outer contour of the obstacle.

The second threshold may be set and adjusted according to requirements of an actual application scenario, for example, the second threshold may be 0.5, which is not specifically limited in the present embodiment.

Through the second grid map determined in this step, the position of the outer contour of the obstacle around the vehicle can be accurately and effectively described.

In an embodiment, after the second grid map is determined, it is also possible to convert the second grid map into a picture in which grid cells in different states are distinguished, so as to show the position of the outer contour of the obstacle around the vehicle more intuitively.

Figure 6:
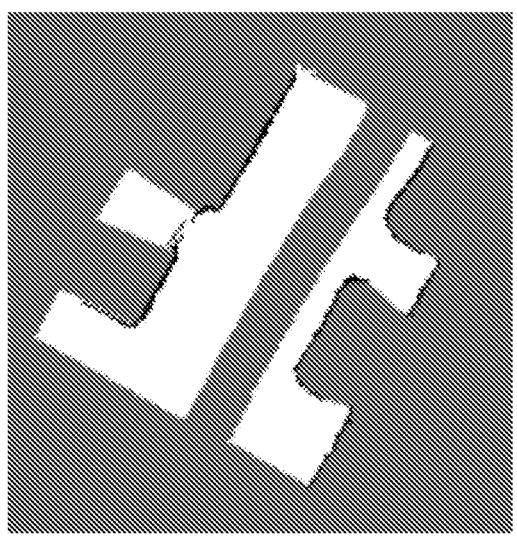
FIG. 6 is an exemplary diagram illustrating a picture corresponding to a second grid map according to the second embodiment of the present disclosure.

For example, the second threshold may be 0.5: when a grid cell corresponds to a probability value of 0.5, the grid cell is in an unknown state; when a grid cell corresponds to a probability value less than 0.5, the grid cell is not occupied, that is, the grid cell is empty; when a grid cell corresponds to a probability value greater than 0.5, the grid cell is occupied, that is, there is an obstacle in the grid cell. When the second grid map is converted into a picture for displaying in a more intuitive manner, an occupied grid cell may be painted in black, an unoccupied grid cell may be painted in white, and a grid cell with an unknown state may be painted in gray to form the picture shown in FIG. 6. It can be clearly seen that the picture corresponding to the second grid map determined according to the image data shown in FIG. 6 is more accurate in terms of the position of the outer contour of the obstacle compared with the picture corresponding to the first grid map determined according to the ultrasonic data shown in FIG. 5.

Further, a type of an obstacle around the vehicle can be identified according to the image data, and generating the second grid map according to a grounding point of an outer contour of an obstacle of a preset type and determining a spatial parking place can avoid a situation in which parking place detection is erroneous since part of space composed of people is detected as a spatial parking place. The obstacle of the preset type may be set and adjusted according to requirements of an actual application scenario, which is not specifically limited here. For example, the obstacle of the preset type may include: vehicle obstacles, walls, pillars, grassland, curbs, etc.

Step S307: identifying positions of obstacle segments in the second grid map, and determining a spatial parking place around the vehicle according to the positions of the obstacle segments to obtain the second spatial parking place.

This step is similar to implementations of Step S304 described above. For details, reference may be made to relevant descriptions of Step S304 described above, which will not be repeated here again.

In the present embodiment, after the image data around the vehicle is acquired, through Steps S305-S307, the second spatial parking place around the vehicle is determined according to the image data. In this way, when the ultrasonic sensor is prone to crosstalk effects, a spatial parking place can be detected through the image data so that the problem of ultrasonic crosstalk can be solved and the detection accuracy and detection rate of the spatial parking place are improved. Since the detection range of the image data is large, the detection range of the spatial parking place can be expanded. Based on the image data, obstacle information around an obstacle can be fully mined, including not only obstacle information on a frontal side of the obstacle vehicle, but also obstacle information on a lateral side of the obstacle vehicle, thus the accuracy of spatial parking place detection can be significantly improved.

Step S308: fusing the first spatial parking place and the second spatial parking place that are located at an identical position to determine a spatial parking place at that position.

After the first spatial parking place around the vehicle is determined according to the ultrasonic data and the second spatial parking place around the vehicle is determined according to the image data, it is also possible to fuse the first spatial parking place and the second spatial parking place that are located at an identical position to determine a spatial parking place at that position so that the accuracy of spatial parking place detection can be further improved.

In an embodiment, this step may be specifically implemented in the following manner:

fusing the first spatial parking place and the second spatial parking place that are located at the identical position to determine a first fused spatial parking place for use as the spatial parking place at that position. The spatial parking places determined based on different data sources may be fused to determine an ultimate spatial parking place so that the accuracy of spatial parking place detection can be further improved.

In an embodiment, this step may also be specifically implemented in the following manner:

fusing the first spatial parking place and the second spatial parking place that are located at the identical position to determine a first fused spatial parking place; and fusing the first fused spatial parking place and a historical spatial parking place located at the identical position to determine a second fused spatial parking place for use as the spatial parking place at that position.

The historical spatial parking place is a fused spatial parking place determined and stored in a previous period of time.

Specifically, after the first spatial parking place and the second spatial parking place that are located at the identical position are fused to determine the first fused spatial parking place, for any first fused spatial parking place, it is determined whether there is a historical parking place located at the identical position to the first fused spatial parking place. If yes, the first fused spatial parking place and the historical spatial parking place located at the identical position is fused to determine a second fused spatial parking place for use as the spatial parking place at that position. If no, the first fused spatial parking place is used as the spatial parking place at that position.

Fusing spatial parking places determined based on different data sources to determine the ultimate spatial parking place can improve the accuracy of spatial parking place detection; moreover, further fusing a fused spatial parking place determined at a current period of time and the fused spatial parking place determined at the previous period of time can further improve the accuracy of spatial parking place detection.

In an embodiment, before the first spatial parking place and the second spatial parking place that are located at the identical position are fused to determine the spatial parking place at that position, the first spatial parking place and the second spatial parking place that are located at the identical position is determining according to a degree of coincidence between any first spatial parking place and any second spatial parking place.

If the degree of coincidence between any first spatial parking place and any second spatial parking place is greater than a preset degree of coincidence, it is determined that the first spatial parking place and the second spatial parking place are located at the identical position. The preset degree of coincidence may be set and adjusted according to requirements of an actual application scenario, which is not specifically limited here in the present embodiment.

According to the degree of coincidence between the first spatial parking place and the second spatial parking place, it can be accurately determined whether the first spatial parking place and the second spatial parking place are located at an identical position, and then the spatial parking places located at the identical position may be fused to improve the accuracy of the position of a spatial parking place.

In a practical application, the position of the spatial parking place is determined by positional marker coordinates and a warehousing orientation angle of the spatial parking place. A positional marker of the spatial parking place may be a midpoint of an entrance boundary of the spatial parking place or may be set as another position point, which is not specifically limited here.

Further, the fusing the first spatial parking place and the second spatial parking place that are located at the identical position to determine the spatial parking place at that position may be specifically implemented in the following manner:

fusing positional marker coordinates of the first spatial parking place and the second spatial parking place that are located at the identical position to obtain fused positional marker coordinates, and fusing warehousing orientation angles of the first spatial parking place and the second spatial parking place to obtain a fused warehousing orientation angle; and determining the spatial parking place at that position according to the fused positional marker coordinates and the fused warehousing orientation angle. In this way, the first spatial parking place and the second spatial parking place located at the identical position can be fused to improve the accuracy of the position of a spatial parking place.

In an embodiment, fusing the positional marker coordinates of the first spatial parking place and the second spatial parking place that are located at the identical position may be performing weighted averaging on the positional marker coordinates of the first spatial parking place and the second spatial parking place to obtain fused positional marker coordinates; and fusing warehousing orientation angles of the first spatial parking place and the second spatial parking place may be performing weighted averaging on the warehousing orientation angles of the first spatial parking place and the second spatial parking place to obtain a fused warehousing orientation angle.

In an embodiment, when the first spatial parking place and the second spatial parking place are fused, since determining the spatial parking place based on the image data has a high accuracy, the weight of the second spatial parking place may be set to be greater than the weight of the first spatial parking place so as to improve the accuracy of the position of the fused spatial parking place.

Step S309: detecting, according to the image data, whether the spatial parking places at all the positions are available, and determining the available spatial parking places from the spatial parking places at all the positions.

In the present embodiment, after the first spatial parking place and the second spatial parking place that are located at the identical position are fused to determine the spatial parking place at that position, it is possible to detect whether the spatial parking places at all the positions are available, and determine the available spatial parking places from the spatial parking places at all the positions, so that those unavailable spatial parking places can be excluded for assurance that the spatial parking places finally provided to the vehicle are available, and the parking success rate of the vehicle can be improved for a smoother parking process.

In this step, validity checking may be performed on a parking place according to plane geometric constraints and obstacle distributions.

In an embodiment, in this step, it can be detected whether a spatial parking place satisfies at least one of the following conditions:
whether the spatial parking place meets a dimension requirement, and whether the spatial parking place has an obstacle affecting parking therein.

Exemplarily, whether the spatial parking place has a dimension that meets parking requirements of the current vehicle is, for example, whether the width of the spatial parking place is greater than the width of the current vehicle.

Exemplarily, detecting whether the spatial parking place has an obstacle affecting parking therein may include:
detecting whether there is an obstacle in the spatial parking place, and determining that the spatial parking place is available if there is no obstacle in the spatial parking place; and
if there is an obstacle, determining whether the obstacle is movable; if there is an immovable obstacle in the spatial parking place, and the size of the area occupied by the immovable obstacle in the spatial parking place (which can be the number of grid cells occupied) is greater than a preset fault-tolerance threshold, determining that the spatial parking place has an obstacle affecting parking therein, i.e. the spatial parking place is unavailable;
if there is a movable obstacle in the spatial parking place, and the movable obstacle can actively avoid the vehicle, determining that the spatial parking place has no obstacle affecting parking therein, i.e. the spatial parking place is available; and
if there is a movable obstacle in the spatial parking place, and the movable obstacle cannot actively avoid the vehicle, then prompting a person in the vehicle of a type of the obstacle (such as a cone, a bicycle, etc.) in absence of another available spatial parking place, and the obstacle may be manually removed by the person in the vehicle to make room for a spatial parking place.

In the present embodiment, a spatial parking place is generated using two data sources (ultrasonic data and vision-based image data), then fusion is performed at a parking level, and then an obstacle check is performed on the parking place using varieties of data sources, thus the accuracy and detection rate of spatial parking place detection can be fully guaranteed.

Step S310: determining one of the available spatial parking places as a target parking place, and generating, according to a position of the target parking place and a current position of the vehicle, a navigation route for parking into the target parking place from the current position.

After all the available spatial parking places are determined, one of the available spatial parking places is selected as a target parking place used by the current vehicle for parking at this time. With a further possibility, according to a position of the target parking place and a current position of the vehicle, a navigation route for parking into the target parking place from the current position is automatically generated, so as to provide the vehicle with a navigation function for parking into the target parking place so that the parking success rate can be improved.

In an embodiment, the target parking place of the vehicle may be determined from the available spatial parking places according to the position of each available spatial parking place and the current position of the vehicle.

Specifically, by means of automatically determining the target parking place of the vehicle according to the position of each available spatial parking place and the current position of the vehicle as well as a parking place selection rule, an optimal or relatively optimal available spatial parking place can be automatically selected as the target parking place of the current vehicle so that a parking time of the vehicle can be shorten, thereby improving the parking efficiency and the parking success rate.

In an embodiment, the parking place selection rule may be determined according to at least one of the following: the spatial parking place being positionally closest to the vehicle, the spatial parking place being positionally closest to a navigation route for the vehicle, the spatial parking place being immediately close to a road where the vehicle is currently located and being in a travelling direction of the vehicle, and so on.

The parking place selection rule may be set and adjusted according to requirements of an actual application scenario, which is not specifically limited in the present embodiment.

In an embodiment, all the available spatial parking places may also be shown to a user for the user's self-selection of a target parking place in desire to park in, which may be specifically implemented in the following manner:
displaying the available spatial parking places and position information of the available spatial parking places in map data; and in response to a selection operation on any one of the available spatial parking places, determining a selected available spatial parking place to be the target parking place of the vehicle. The target parking place a user wants to park in can be selected by the user according to its own needs, which is more in line with the user's needs and can improve the parking success rate.

Step S311: controlling the vehicle to park into the target parking place according to the navigation route.

This step is an optional step. After the navigation route for parking into the target parking place from the current position is generated, it is also possible to control the vehicle to park into the target parking place, so that autonomous parking can be achieved and the success rate thereof can be improved.

The present embodiment allows for: acquiring ultrasonic data around a vehicle collected by an ultrasonic sensor on the vehicle and image data around the vehicle collected by an image collection apparatus; constructing a first grid map according to the ultrasonic data and determining a first spatial parking place around the vehicle according to the first grid map; simultaneously, constructing a second grid map according to the image data and determining a second spatial parking place around the vehicle according to the second grid map; fusing the first spatial parking place and the second spatial parking place that are located at an identical position to determine a spatial parking place at that position; and finally determining available spatial parking places of the vehicle by means of detecting spatial parking places respectively with two different data sources, i.e. the ultrasonic data and the image data, and fusing the spatial parking places and checking availability of the detected spatial parking places. In this way, the problem of ultrasonic crosstalk can be solved and the detection accuracy and detection rate of the spatial parking place are improved. Since the detection range of the image data is large, the detection range of the spatial parking place can be expanded. Based on the image data, obstacle information around an obstacle can be fully mined, including not only obstacle information on a frontal side of the obstacle vehicle, but also obstacle information on a lateral side of the obstacle vehicle, thus the accuracy of spatial parking place detection can be significantly improved. Further, by means of determining a parking place type and detecting a spatial parking place according to the parking place type, the detection accuracy and detection rate of the spatial parking place can be improved compared with only detecting a spatial parking place according to spatial size and then determining the position of the detected spatial parking place; by means of fusing a first fused spatial parking place and a historical spatial parking place located at an identical position, the accuracy of the position of the spatial parking place can be improved.

Figure 7:
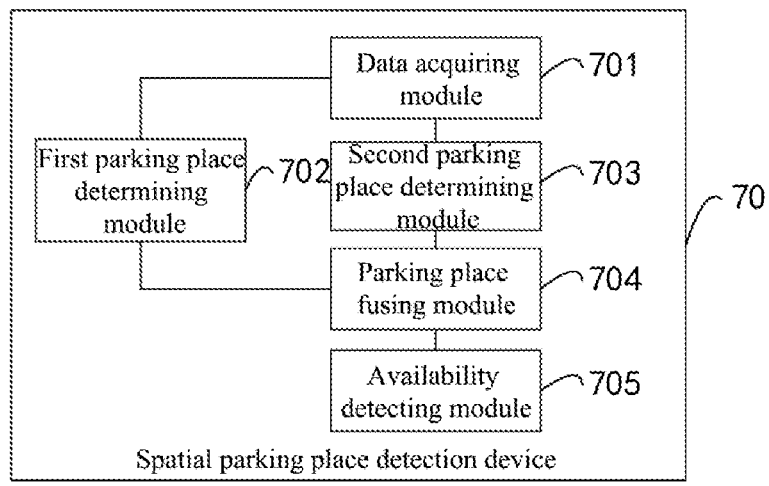
FIG. 7 is a schematic structural diagram of a spatial parking place detection device according to a third embodiment of the present disclosure.

FIG. 7 is a schematic structural diagram of a spatial parking place detection device according to a third embodiment of the present disclosure. The spatial parking place detection device provided in the present embodiment may execute a processing flow provided in an embodiment of the spatial parking place detection method. As shown in FIG. 7, the spatial parking place detection device 70 includes: a data acquiring module 701, a first parking place determining module 702, a second parking place determining module 703, a parking place fusing module 704, and an availability detecting module 705.

Specifically, the data acquiring module 701 is configured to acquire, during a vehicle traveling process, ultrasonic data around a vehicle collected by an ultrasonic sensor on the vehicle, and image data around the vehicle collected by an image collection apparatus.

The first parking place determining module 702 is configure to determine a first spatial parking place around the vehicle according to the ultrasonic data.

The second parking place determining module 703 is configured to determine a second spatial parking place around the vehicle according to the image data.

The parking place fusing module 704 is configured to fuse the first spatial parking place and the second spatial parking place that are located at an identical position to determine a spatial parking place at that position.

The availability detecting module 705 is configured to determine available spatial parking places of the vehicle from spatial parking places at all positions.

The device provided in the embodiment of the present disclosure may be specifically configured to execute the method according to the first embodiment described above. For specific functions and effects, details will not be described here again.

The present embodiment allows for: acquiring ultrasonic data around a vehicle collected by an ultrasonic sensor on the vehicle and image data around the vehicle collected by an image collection apparatus; determining a first spatial parking place around the vehicle according to the ultrasonic data, and determining a second spatial parking place around the vehicle according to the image data; fusing the first spatial parking place and the second spatial parking place that are located at an identical position to determine a spatial parking place at that position; and finally determining available spatial parking places of the vehicle by means of detecting spatial parking places respectively with two different data sources, i.e. the ultrasonic data and the image data, and fusing the spatial parking places and checking availability of the detected spatial parking places. In this way, when the ultrasonic sensor is prone to crosstalk effects, a spatial parking place can be detected through the image data so that the problem of ultrasonic crosstalk can be solved and the detection accuracy and detection rate of the spatial parking place are improved. Since the detection range of the image data is large, the detection range of the spatial parking place can be expanded. Based on the image data, obstacle information around an obstacle can be fully mined, including not only obstacle information on a frontal side of the obstacle vehicle, but also obstacle information on a lateral side of the obstacle vehicle, thus the accuracy of spatial parking place detection can be significantly improved.

Figure 8:
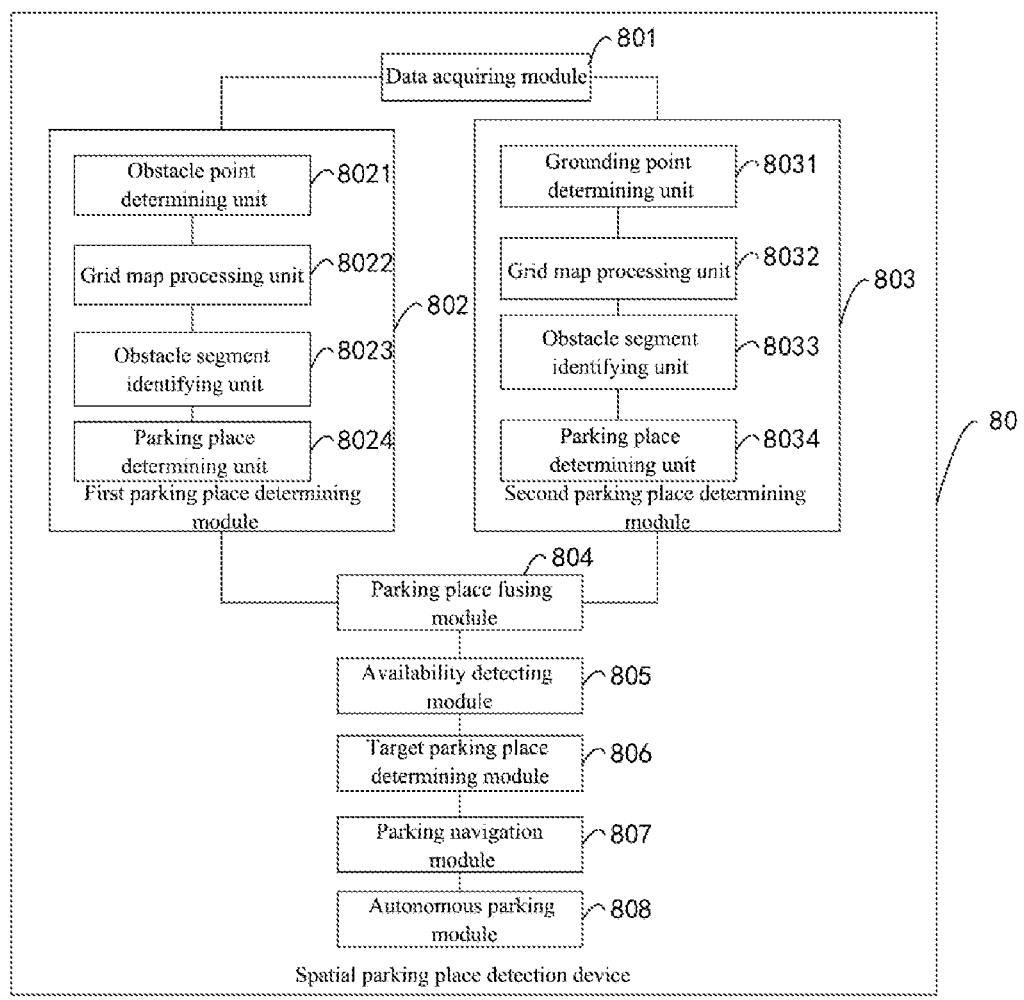
FIG. 8 is a schematic structural diagram of a spatial parking place detection device according to a fourth embodiment of the present disclosure.

FIG. 8 is a schematic structural diagram of a spatial parking place detection device according to a fourth embodiment of the present disclosure. The spatial parking place detection device provided in the present embodiment may execute a processing flow provided in an embodiment of the spatial parking place detection method. As shown in FIG. 8, the spatial parking place detection device 80 includes: a data acquiring module 801, a first parking place determining module 802, a second parking place determining module 803, a parking place fusing module 804, and an availability detecting module 805.

Specifically, the data acquiring module 801 is configured to acquire, during a vehicle traveling process, ultrasonic data around a vehicle collected by an ultrasonic sensor on the vehicle, and image data around the vehicle collected by an image collection apparatus.

The first parking place determining module 802 is configure to determine a first spatial parking place around the vehicle according to the ultrasonic data.

The second parking place determining module 803 is configured to determine a second spatial parking place around the vehicle according to the image data.

The parking place fusing module 804 is configured to fuse the first spatial parking place and the second spatial parking place that are located at an identical position to determine a spatial parking place at that position.

The availability detecting module 805 is configured to determine available spatial parking places of the vehicle from spatial parking places at all positions.

In an embodiment, as shown in FIG. 8, the first parking place determining module 802 includes:

an obstacle point determining unit 8021, configured to determine positions of obstacle points around the vehicle according to the ultrasonic data;

a grid map processing unit 8022, configured to construct an occupancy grid map according to the positions of the obstacle points to obtain a first grid map; and an obstacle segment identifying unit 8023, configured to identify positions of obstacle segments in the first grid map; and a parking place determining unit 8024, configured to determine a spatial parking place around the vehicle according to the positions of the obstacle segments to obtain the first spatial parking place.

In an embodiment, as shown in FIG. 8, the second parking place determining module 803 includes:

a grounding point determining unit 8031, configured to determine coordinates of a grounding point of an outer contour of an obstacle around the vehicle according to the image data;

a grid map processing unit 8032, configured to construct an occupancy grid map according to the coordinates of the grounding point of the outer contour of the obstacle to obtain a second grid map;

an obstacle segment identifying unit 8033, configured to identify positions of obstacle segments in the second grid map; and a parking place determining unit 8034, configured to determine a spatial parking place around the vehicle according to the positions of the obstacle segments to obtain the second spatial parking place.

In an embodiment, any of the obstacle segment identifying units (the obstacle segment identifying unit 8023 or the obstacle segment identifying unit 8033) is configured to:

extract linear segments in the occupancy grid map to obtain the obstacle segments around the vehicle, and determine the positions of the obstacle segments.

In an embodiment, any of the parking place determining unit (the parking place determining unit 8024 or the parking place determining unit 8034) includes:

an obstacle segment sieving subunit, configured to sieve obstacle segments adaptable to a length direction of the vehicle according to the positions of the obstacle segments and pose information of the vehicle; and a parking place determining subunit, configured to determine, for any two adjacent obstacle segments of the sieved obstacle segments, a spatial parking place between the two adjacent obstacle segments according to a spacing distance between the two adjacent obstacle segments along the length direction of the vehicle, a parking place type of the spatial parking place around the vehicle and a parking place dimension corresponding to the parking place type.

In an embodiment, the parking place determining subunit further includes:

a parking place type determining subunit, configured to: determine the parking place type of the spatial parking place around the vehicle before, for any two adjacent obstacle segments of the sieved obstacle segments, the spatial parking place between the two adjacent obstacle segments is determined according to the spacing distance between the two adjacent obstacle segments along the length direction of the vehicle, the parking place type of the spatial parking place and the parking place dimension corresponding to the parking place type.

In an embodiment, the parking place type determining subunit is further configured to:

perform an image identification according to the image data to determine a vehicle obstacle around the vehicle, where the vehicle obstacle refers to an obstacle whose type is a vehicle; and determine the parking place type of the spatial parking place around the vehicle according to a parking direction of a vehicle obstacle lateral to the vehicle.

In an embodiment, the parking place type determining subunit is further configured to:

sieve a longitudinal vehicle boundary segment and a transversal vehicle boundary segment according to lengths of the obstacle segments around the vehicle, where the longitudinal vehicle boundary segment refers to an obstacle segment whose segment length is within a range of longitudinal lengths of the vehicle, and the transversal vehicle boundary segment refers to an obstacle segment whose segment length is within a range of transversal widths of the vehicle; and determine the parking place type of the spatial parking place around the vehicle according to positions of the longitudinal vehicle boundary segment and the transversal vehicle boundary segment.

In an embodiment, the parking place fusing module is specifically configured to:

fuse the first spatial parking place and the second spatial parking place that are located at the identical position to determine a first fused spatial parking place for use as the spatial parking place at that position.

In an embodiment, the parking place fusing module is specifically configured to:

fuse the first spatial parking place and the second spatial parking place that are located at the identical position to determine a first fused spatial parking place; and fuse the first fused spatial parking place and a historical spatial parking place located at the identical position to determine a second fused spatial parking place for use as the spatial parking place at that position; where the historical spatial parking place is a fused spatial parking place determined and stored in a previous period of time.

In an embodiment, the parking place fusing module is further configured to:

fuse positional marker coordinates of the first spatial parking place and the second spatial parking place that are located at the identical position to obtain fused positional marker coordinates, and fuse warehousing orientation angles of the first spatial parking place and the second spatial parking place to obtain a fused warehousing orientation angle; and determine the spatial parking place at that position according to the fused positional marker coordinates and the fused warehousing orientation angle.

In an embodiment, the parking place fusing module is further configured to:

determine, according to a degree of coincidence between any first spatial parking place and any second spatial parking place, the first spatial parking place and the second spatial parking place that are located at the identical position before the first spatial parking place and the second spatial parking place that are located at the identical position are fused to determine the spatial parking place at that position;

where if the degree of coincidence between any first spatial parking place and any second spatial parking place is greater than a preset degree of coincidence, it is determined that the first spatial parking place and the second spatial parking place are located at the identical position.

In an embodiment, the availability detecting module is specifically configured to:

detect, according to the image data, whether the spatial parking places at all the positions are available, and determine the available spatial parking places from the spatial parking places at all the positions.

In an embodiment, as shown in FIG. 8, the spatial parking place detection device 80 further includes:

a target parking place determining module 806, configured to determine one of the available spatial parking places as a target parking place after the available spatial parking places of the vehicle are determined from the spatial parking places at all the positions; and a parking navigation module 807, configured to generate, according to a position of the target parking place and a current position of the vehicle, a navigation route for parking into the target parking place from the current position.

In an embodiment, as shown in FIG. 8, the spatial parking place detection device 80 further includes:

an autonomous parking module 808, configured to control the vehicle to park into the target parking place according to the navigation route after the navigation route from the current position to the target parking place is generated according to the position of the target parking place and the current position of the vehicle.

In an embodiment, the target parking place determining module is specifically configured to:

determine the target parking place of the vehicle according to a position of each of the available spatial parking places and a current position of the vehicle.

In an embodiment, the target parking place determining module is specifically configured to:

display the available spatial parking places and position information of the available spatial parking places in map data; and in response to a selection operation on any one of the available spatial parking places, determine a selected available spatial parking place to be the target parking place of the vehicle.

The device provided in the embodiment of the present disclosure may be specifically configured to execute a method according to the second embodiment described above. For specific functions and effects, details will not be described here again.

The present embodiment allows for: acquiring ultrasonic data around a vehicle collected by an ultrasonic sensor on the vehicle and image data around the vehicle collected by an image collection apparatus; constructing a first grid map according to the ultrasonic data and determining a first spatial parking place around the vehicle according to the first grid map; simultaneously, constructing a second grid map according to the image data and determining a second spatial parking place around the vehicle according to the second grid map; fusing the first spatial parking place and the second spatial parking place that are located at an identical position to determine a spatial parking place at that position; and finally determining available spatial parking places of the vehicle by means of detecting spatial parking places respectively with two different data sources, i.e. the ultrasonic data and the image data, and fusing the spatial parking places and checking availability of the detected spatial parking places. In this way, the problem of ultrasonic crosstalk can be solved and the detection accuracy and detection rate of the spatial parking place are improved.

Since the detection range of the image data is large, the detection range of the spatial parking place can be expanded. Based on the image data, obstacle information around an obstacle can be fully mined, including not only obstacle information on a frontal side of the obstacle vehicle, but also obstacle information on a lateral side of the obstacle vehicle, thus the accuracy of spatial parking place detection can be significantly improved. Further, by means of determining a parking place type and detecting a spatial parking place according to the parking place type, the detection accuracy and detection rate of the spatial parking place can be improved compared with only detecting a spatial parking place according to spatial size and then determining the position of the detected spatial parking place; by means of fusing a first fused spatial parking place and a historical spatial parking place located at an identical position, the accuracy of the position of the spatial parking place can be improved.

In the technical solutions of the present disclosure, the acquisition, storage and application of a user's personal information are in compliance with the provisions of relevant laws and regulations, and do not violate public order and moral.

According to embodiments of the present disclosure, the present disclosure also provides an electronic device, a readable storage medium, and a computer program product.

According to an embodiment of the present disclosure, the present disclosure also provides a computer program product, where the computer program product includes a computer program stored in a readable storage medium, at least one processor of an electronic device may read the computer program from the readable medium storage, and the at least one processor executes the computer program to enable the electronic device to execute the solution provided in any one of the aforementioned embodiments.

Figure 9:
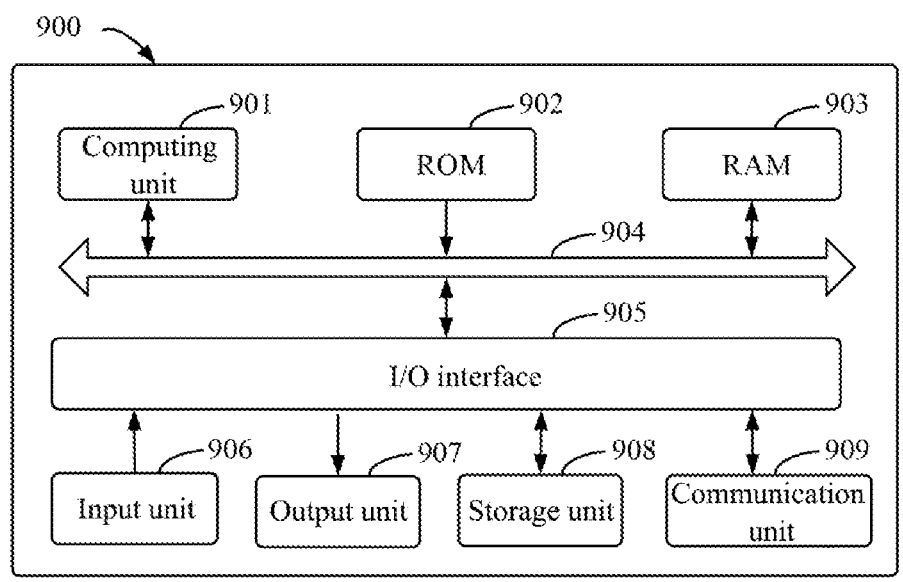
FIG. 9 is a schematic block diagram of an electronic device for implementing a spatial parking place detection method according to an embodiment of the present disclosure.

FIG. 9 shows a schematic block diagram illustrating an exemplary electronic device 900 which can be used to implement an embodiment of the present disclosure. The electronic device is intended to represent various forms of digital computers, such as a laptop computer, a desktop computer, a workstation, a personal digital assistant, a server, a blade server, a mainframe computer and other suitable computers. The electronic device may also represent various forms of mobile apparatuses, such as a personal digital assistant, a cellular phone, a smart phone, a wearable device and other similar computing apparatuses. The components shown herein, their connections and relationships, and their functions are merely exemplary, and are not intended to limit the implementations of the present disclosure described and/or claimed herein.

As shown in FIG. 9, the device 900 includes a computing unit 901, which may perform various appropriate actions and processes according to a computer program stored in a read-only memory (ROM) 902 or a computer program loaded from a storage unit 908 to a random access memory (RAM) 903. In the RAM 903, various programs and data required for operations of the device 900 may also be stored. The computing unit 901, the ROM 902 and the RAM 903 are connected to each other through a bus 904. An input/output (I/O) interface 905 is also connected to the bus 904.

Multiple components in the device 900 are connected to the I/O interface 905, and the components include: an input unit 906, such as a keyboard, a mouse, etc.; an output unit 907, such as various types of displays, speakers, etc.; the storage unit 908, such as a magnetic disk, an optical disc, etc.; and a communication unit 909, such as a network card, a modem, a wireless communication transceiver, etc. The communication unit 909 allows the device 900 to exchange information/data with other devices over a computer network such as Internet and/or various telecommunication networks.

The computing unit 901 may be various general-purpose and/or special-purpose processing components with processing and computing capabilities. Some examples of the computing unit 901 include, but are not limited to, central processing units (CPU), graphic processing units (GPU), various dedicated artificial intelligence (AI) computing chips, various computing units that run machine learning model algorithms, digital signal processors (DSP), and also any appropriate processors, controllers, microcontrollers, etc. The computing unit 901 executes each method and process described above, for example, the spatial parking place detection method. For example, in some embodiments, the spatial parking place detection method can be implemented as a computer software program, which is tangibly contained in a machine-readable medium, such as the storage unit 908. In some embodiments, part or entirety of the computer program may be loaded and/or installed into the device 900 via the ROM 902 and/or the communication unit 909. When the computer program is loaded into the RAM 903 and executed by the computing unit 901, one or more steps of the spatial parking place detection method as described above may be executed. Alternatively, in other embodiments, the computing unit 901 may be configured to perform the spatial parking place detection method in any other suitable manner (for example, by means of firmware).

Various implementations of the systems and technologies described above herein may be implemented in digital electronic circuit systems, integrated circuit systems, field programmable gate arrays (FPGA), application specific integrated circuits (ASIC), application specific standard parts (ASSP), system-on-chips (SOC), complex programmable logic devices (CPLD), computer hardware, firmware, software, and/or their combination. These various implementations may include: being implemented in one or more computer programs, where the one or more computer programs may be executed and/or interpreted on a programmable system including at least one programmable processor. The programmable processor may be a special-purpose or general-purpose programmable processor, can receive data and instructions from a storage system, at least one input apparatus and at least one output apparatus, and transmit the data and instructions to the storage system, the at least one input apparatus and the at least one output apparatus.

Program codes for implementing the method of the present disclosure can be written in one programming language or any combination of multiple programming languages. These program codes can be provided to a processor or a controller of a general-purpose computer, a special-purpose computer, or other programmable data processing apparatus, so that functions/operations specified in flowcharts and/or block diagrams are implemented when the program codes are executed by the processor or the controller. The program codes may be executed entirely on a machine, partly on the machine, partly executed on the machine and partly executed on a remote machine as an independent software package, or entirely executed on the remote machine or a server.

In the context of the present disclosure, the machine-readable medium may be a tangible medium, which may contain or store a program for an instruction execution system, apparatus, or device to use or to be used in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of the machine-readable storage medium would include an electrically connected portable computer disk based on one or more wires, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the foregoing.

In order to provide interaction with users, the systems and techniques described herein can be implemented on a computer, where the computer has: a display apparatus for displaying information to users (for example, a CRT (cathode ray tube) or LCD (liquid crystal display) monitor); and a keyboard and a pointing apparatus (for example, a mouse or a trackball) through which the users can provide input to the computer. Other kinds of apparatuses can also be used to provide interaction with the users; for example, a feedback provided to the users may be any form of sensory feedback (for example, visual feedback, auditory feedback, or tactile feedback); and input from the users can be received in any form (including acoustic input, voice input, or tactile input).

The systems and technologies described herein can be implemented in a computing system that includes background components (for example, as a data server), or a computing system that includes middleware components (for example, an application server), or a computing system that includes front-end components (for example, a user computer with a graphical user interface or a web browser through which the user can interact with implementations of the systems and technologies described herein), or a computing system that includes any combination of such background components, middleware components or front-end components. The components of the system can be connected to each other through digital data communication in any form or medium (for example, a communication network). Examples of the communication network include: a local area network (LAN), a wide area network (WAN) and the Internet.

The computing system may include a client and a server. The client and server are generally far away from each other and usually interact through a communication network. A relationship between the client and the server is generated through computer programs running on corresponding computers and having a client-server relationship with each other. The server may be a cloud server, also known as a cloud computing server or a cloud host, which is a host product in a cloud computing service system to overcome defects of huge management difficulty and weak business scalability existing in a traditional physical host and a VPS service ("Virtual Private Server", or "VPS" for short). The server may also be a server of a distributed system, or a server combined with a blockchain.

It should be understood that various forms of processes shown above may be used to reorder, add or delete steps. For example, the steps described in the present disclosure may be executed in parallel, sequentially or in a different order, as long as a desired result of the technical solution disclosed in the present disclosure can be achieved, and there is no limitation herein.

The aforementioned specific implementations do not constitute a limitation to the protection scope of the present disclosure. Persons skilled in the art should understand that various modifications, combinations, sub-combinations and substitutions may be made according to design requirements and other factors. Any modification, equivalent replacement and improvement, etc. made within the spirit and principle of the present disclosure shall be included in the protection scope of the present disclosure.

What is claimed is:

1. A spatial parking place detection method, comprising:
acquiring, during a vehicle traveling process, ultrasonic data around a vehicle collected by an ultrasonic sensor on the vehicle, and image data around the vehicle collected by an image collection apparatus;
determining a first spatial parking place around the vehicle according to the ultrasonic data, and determining a second spatial parking place around the vehicle according to the image data;
fusing the first spatial parking place and the second spatial parking place that are located at an identical position to determine a spatial parking place at that position; and
determining available spatial parking places of the vehicle from spatial parking places at all positions;
wherein the determining the first spatial parking place around the vehicle according to the ultrasonic data comprises:
determining positions of obstacle points around the vehicle according to the ultrasonic data;
constructing an occupancy grid map according to the positions of the obstacle points to obtain a first grid map; and
identifying positions of obstacle segments in the first grid map, and determining a spatial parking place around the vehicle according to the positions of the obstacle segments to obtain the first spatial parking place;
wherein the determining the spatial parking place around the vehicle according to the positions of the obstacle segments comprises:
sieving obstacle segments adaptable to a length direction of the vehicle according to the positions of the obstacle segments and pose information of the vehicle; and
determining, for any two adjacent obstacle segments of the sieved obstacle segments, a spatial parking place between the two adjacent obstacle segments according to a spacing distance between the two adjacent obstacle segments along the length direction of the vehicle, a parking place type of the spatial parking place around the vehicle and a parking place dimension corresponding to the parking place type.

2. A spatial parking place detection device, comprising:
a memory, a processor, and a computer program stored on the memory and operable on the processor,
wherein the processor, when running the computer program, is configured to:
acquire, during a vehicle traveling process, ultrasonic data around a vehicle collected by an ultrasonic sensor on the vehicle, and image data around the vehicle collected by an image collection apparatus;
determine a first spatial parking place around the vehicle according to the ultrasonic data;
determine a second spatial parking place around the vehicle according to the image data;
fuse the first spatial parking place and the second spatial parking place that are located at an identical position to determine a spatial parking place at that position; and
determine available spatial parking places of the vehicle from spatial parking places at all positions;
wherein the processor is further configured to:
determine positions of obstacle points around the vehicle according to the ultrasonic data;
construct an occupancy grid map according to the positions of the obstacle points to obtain a first grid map; and
identify positions of obstacle segments in the first grid map, and determine a spatial parking place around the vehicle according to the positions of the obstacle segments to obtain the first spatial parking place;
wherein the processor is further configured to:
sieve obstacle segments adaptable to a length direction of the vehicle according to the positions of the obstacle segments and pose information of the vehicle; and
determine, for any two adjacent obstacle segments of the sieved obstacle segments, a spatial parking place between the two adjacent obstacle segments according to a spacing distance between the two adjacent obstacle segments along the length direction of the vehicle, a parking place type of the spatial parking place around the vehicle and a parking place dimension corresponding to the parking place type.

3. The method according to claim 1, wherein the determining the second spatial parking place around the vehicle according to the image data comprises:
determining coordinates of a grounding point of an outer contour of an obstacle around the vehicle according to the image data;
constructing an occupancy grid map according to the coordinates of the grounding point of the outer contour of the obstacle to obtain a second grid map; and
identifying positions of obstacle segments in the second grid map, and determining a spatial parking place around the vehicle according to the positions of the obstacle segments to obtain the second spatial parking place.

4. The method according to claim 1, wherein the identifying the positions of the obstacle segments in any occupancy grid map comprises:
extracting linear segments in the occupancy grid map to obtain the obstacle segments around the vehicle, and determining the positions of the obstacle segments.

5. A non-transitory computer-readable storage medium having stored therein computer instructions, wherein the computer instructions are configured to enable a computer to:
acquire, during a vehicle traveling process, ultrasonic data around a vehicle collected by an ultrasonic sensor on the vehicle, and image data around the vehicle collected by an image collection apparatus;
determine a first spatial parking place around the vehicle according to the ultrasonic data;
determine a second spatial parking place around the vehicle according to the image data;
fuse the first spatial parking place and the second spatial parking place that are located at an identical position to determine a spatial parking place at that position; and
determine available spatial parking places of the vehicle from spatial parking places at all positions;
wherein the computer instructions are configured to enable the computer to:
determine positions of obstacle points around the vehicle according to the ultrasonic data;
construct an occupancy grid map according to the positions of the obstacle points to obtain a first grid map; and
identify positions of obstacle segments in the first grid map, and determine a spatial parking place around the vehicle according to the positions of the obstacle segments to obtain the first spatial parking place;
wherein the computer instructions are further configured to enable the computer to:
sieve obstacle segments adaptable to a length direction of the vehicle according to the positions of the obstacle segments and pose information of the vehicle; and
determine, for any two adjacent obstacle segments of the sieved obstacle segments, a spatial parking place between the two adjacent obstacle segments according to a spacing distance between the two adjacent obstacle segments along the length direction of the vehicle, a parking place type of the spatial parking place around the vehicle and a parking place dimension corresponding to the parking place type.

6. The method according to claim 1, further comprising:
determining the parking place type of the spatial parking place around the vehicle.

7. The method according to claim 6, wherein the determining the parking place type of the spatial parking place around the vehicle comprises:
performing an image identification according to the image data to determine a vehicle obstacle around the vehicle, wherein the vehicle obstacle refers to an obstacle whose type is a vehicle; and
determining the parking place type of the spatial parking place around the vehicle according to a parking direction of a vehicle obstacle lateral to the vehicle.

8. The method according to claim 6, wherein the determining the parking place type of the spatial parking place around the vehicle comprises:
sieving a longitudinal vehicle boundary segment and a transversal vehicle boundary segment according to lengths of the obstacle segments around the vehicle, wherein the longitudinal vehicle boundary segment refers to an obstacle segment whose segment length is within a range of longitudinal lengths of the vehicle, and the transversal vehicle boundary segment refers to an obstacle segment whose segment length is within a range of transversal widths of the vehicle; and
determining the parking place type of the spatial parking place around the vehicle according to positions of the longitudinal vehicle boundary segment and the transversal vehicle boundary segment.

9. The method according to claim 1, wherein the fusing the first spatial parking place and the second spatial parking place that are located at the identical position to determine the spatial parking place at that position comprises:
fusing the first spatial parking place and the second spatial parking place that are located at the identical position to determine a first fused spatial parking place for use as the spatial parking place at that position.

10. The method according to claim 1, wherein the fusing the first spatial parking place and the second spatial parking place that are located at the identical position to determine the spatial parking place at that position comprises:
fusing the first spatial parking place and the second spatial parking place that are located at the identical position to determine a first fused spatial parking place; and
fusing the first fused spatial parking place and a historical spatial parking place located at the identical position to determine a second fused spatial parking place for use as the spatial parking place at that position;
wherein the historical spatial parking place is a fused spatial parking place determined and stored in a previous period of time.

11. The method according to claim 9, wherein the fusing the first spatial parking place and the second spatial parking place that are located at the identical position to determine the spatial parking place at that position comprises:
fusing positional marker coordinates of the first spatial parking place and the second spatial parking place that are located at the identical position to obtain fused positional marker coordinates, and fusing warehousing orientation angles of the first spatial parking place and the second spatial parking place to obtain a fused warehousing orientation angle; and
determining the spatial parking place at that position according to the fused positional marker coordinates and the fused warehousing orientation angle.

12. The method according to claim 1, further comprising:
determining, according to a degree of coincidence between any first spatial parking place and any second spatial parking place, the first spatial parking place and the second spatial parking place that are located at the identical position;
wherein if the degree of coincidence between any first spatial parking place and any second spatial parking place is greater than a preset degree of coincidence, it is determined that the first spatial parking place and the second spatial parking place are located at the identical position.

13. The method according to claim 1, wherein the determining the available spatial parking places of the vehicle from the spatial parking places at all the positions comprises:
detecting, according to the image data, whether the spatial parking places at all the positions are available, and determining the available spatial parking places from the spatial parking places at all the positions.

14. The method according to claim 1, further comprising:
determining one of the available spatial parking places as a target parking place; and
generating, according to a position of the target parking place and a current position of the vehicle, a navigation route for parking into the target parking place from the current position.

15. The method according to claim 14, further comprising:
controlling the vehicle to park into the target parking place according to the navigation route.

16. The method according to claim 14, wherein the determining the one of the available spatial parking places as the target parking place comprises:
determining the target parking place of the vehicle according to a position of each of the available spatial parking places and a current position of the vehicle.

17. The method according to claim 14, wherein the determining the one of the available spatial parking places as the target parking place comprises:
displaying the available spatial parking places and position information of the available spatial parking places in map data; and
in response to a selection operation on any one of the available spatial parking places, determining a selected available spatial parking place to be the target parking place of the vehicle.

* * * * *